Feb. 5, 1952 G. E. BOCKRATH 2,584,666
AIRCRAFT GUST ALLEVIATING CONTROL MEANS
Filed March 11, 1944 2 SHEETS—SHEET 1
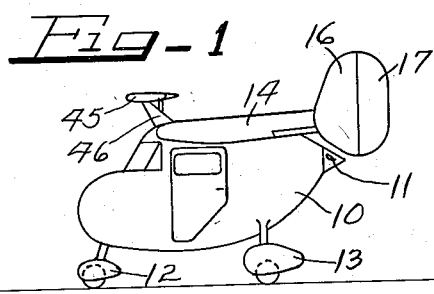
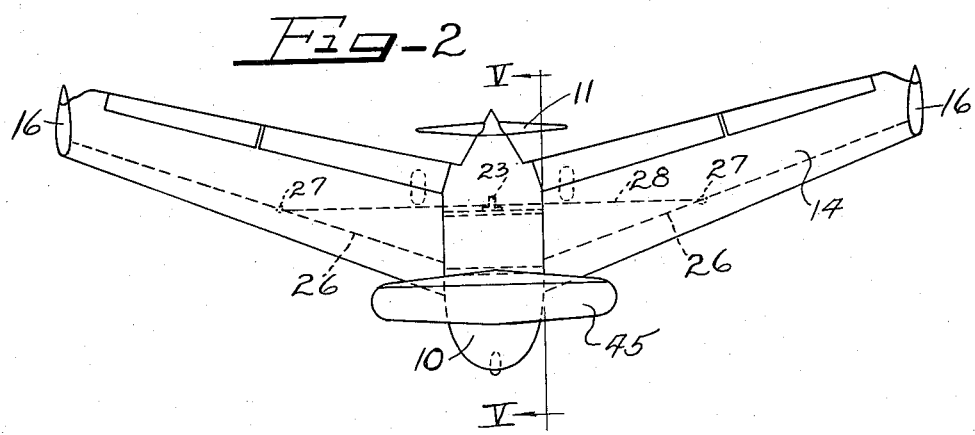
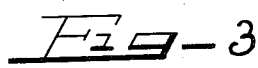
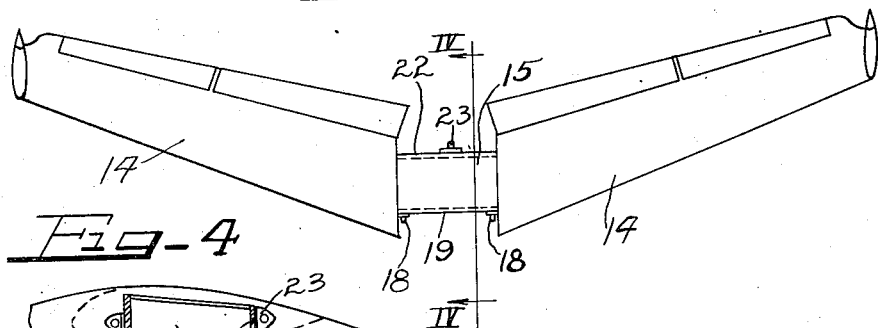
INVENTOR
George E. Bockrath

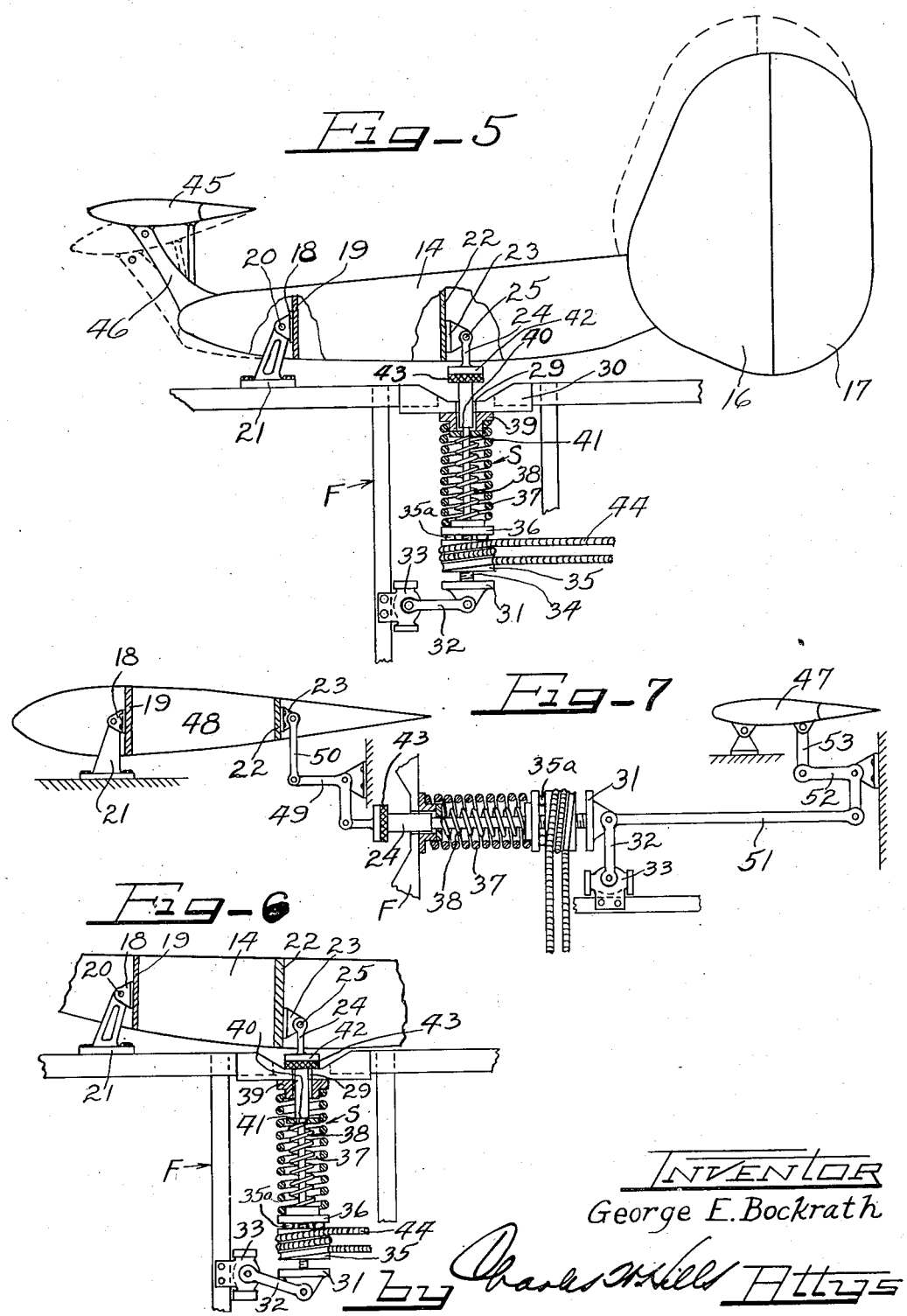

Patented Feb. 5, 1952

2,584,666

UNITED STATES PATENT OFFICE 2,584,666

AIRCRAFT GUST ALLEVIATING CONTROL MEANS

George E. Bockrath, Long Beach, Calif.

Application March 11, 1944, Serial No. 525,980

15 Claims. (Cl. 244—38)

My invention relates to aircraft control and particularly to improved control for preventing sudden up or down acceleration of airplanes when encountering and flying through strong gusts. My invention is of particular utility in connection with aircraft having wing structure of the sweep-back type in which the aerodynamic center is quite far back as projected on the root chord of the wing.

An important object of the invention is to hinge the wing structure to the fuselage with the hinge line a distance rearwardly of the leading edge of the wing at the root chord and forwardly of the aerodynamic center of the wing so that the wing structure may rotate in response to up-gust or down-gust, and to provide spring means attached to the wing structure near or close to its aerodynamic center for connecting the wing structure with the fuselage, with the spring means functioning to control the rotation of the wing structure during up-gust or down-gust to prevent sudden upward or downward acceleration during flight of the airplane, thus to make the flight safer and more comfortable for passengers.

A further object of the invention is to provide a spring assembly which will function to substantially eliminate the disagreeable effect of down-gusts and will to a desired degree reduce the effect of up-gusts.

Another important object is to provide a control arrangement which will assure maintenance of positive load factor or uplift on the wing structure during control of the wing under either up-gust or down-gust conditions.

The above referred to and other features of my invention are embodied in the structure shown on the drawings in which:

Figure 1 is a side elevational view of an airplane embodying my invention;

Figure 2 is a plan view of the airplane;

Figure 3 is a plan view of the wings removed from the fuselage;

Figure 4 is an enlarged section on plane IV—IV Figure 3;

Figure 5 is an enlarged section on plane V—V Figure 2 showing the relative position of the various elements when the airplane is in normal flight;

Figure 6 is a view similar to Figure 5 but showing the position of the various elements when the airplane is on the ground; and Figure 7 is a more or less diagrammatic view showing the application of the invention to a conventional type of airplane.

Figures 1 to 6 show an airplane of the tailless pusher type including the body 10 having a tricycle landing gear including a single forward wheel assembly 12 and laterally disposed rear wheel assembly 13, the propeller 11 being motivated by a suitable power plant housed within the rear portion of the body. The unitary lift or wing structure 14 is composed of right and left wing members mounted on the center spar structure 15, the wing members terminating at their ends in fins 16 on which rudders 17 are mounted. At their inner ends the wing members have hinge brackets 18 secured to the forward beam 19 of the spar structure and these brackets are connected by hinge pins 20 with the upper ends of companion hinge brackets 21 secured to the fuselage structure F which supports the airplane body 10. On the rear beam 22 of the spar structure a bracket 23 is secured and to this bracket a link 24 is connected at its upper end by a hinge pin 25. This pin 25 is located at or near the projected aerodynamic center of the wing members at the root chords thereof. Referring to Figure 2, the line 26 on each wing member indicates the locus of aerodynamic centers of wing cross-sections or chords. The point 27 on each wing member will indicate the aerodynamic center of the wing member, and the axis of the pin 25 is in the aerodynamic center line 28 connecting the points 27 so that the connection between the bracket 23 and the link 24 will be at the mean aerodynamic center of the wing structure. With the wing structure having a pronounced sweep-back, the mean aerodynamic center will be quite far back on the root chords of the wing members and a considerable distance back of the wing structure hinge line through the forward part of the root chords for rotation of the wing structure relative to the fuselage for change of the angle of attack.

Referring to Figure 5, with the wing structure hinged as has been described, a spring assembly S associated with the link 24 will function to control the response of the wing structure to up or down air gusts as the airplane is in flight. The link 24 extends down through an opening 29 in the upper part 30 of the fuselage F and terminates at its lower end in a head 31. This head is connected to the lever 32 of a double acting hydraulic dash pot or damper 33 mounted on the fuselage F. This dash pot controls the speed of rotation of the wing structure 14.

The lower portion 34 of the link 24 is threaded to receive a spirally grooved pulley 35, which turns relative to abutment collar 36 on ball bearings 35a. Above this pulley abutment collar 36 surrounds the link, on which collar an outer spring 37 and an inner spring 38 are seated, these springs encircling the link. An upper collar 39 surrounds the link and abuts against the underside of the fuselage wall portion 30, this upper collar forming an abutment for the upper end of the outer spring 37. Intermediate its ends the link 24 is of reduced diameter to provide the shoulder 40 for the abutment collar 41 which forms an abutment for the upper end of the inner spring 38. Near its outer end the link has the stop flange 42 faced by a cushioning pad 43 of rubber or other cushioning material. When the plane is on the ground and the wing structure is swung down, as shown on Figure 6, the padded stop 42 engages against the top of the fuselage wall portion 30. The spirally grooved pulley 35 is engaged by a belt 44 which is connected to a crank (not shown) in the cockpit of the airplane. Rotation of the crank will rotate the pulley on the threaded lower end of the link 24 for axial movement of the collar 36 for preloading of the springs 37 and 38.

When the plane lands and comes to rest on the ground, the wing structure will swing down to its idle position, as shown on Figure 6, with the link 24 shifted down for engagement of the padded stop 42 with the fuselage. The outer spring 37 will be relaxed to its initial loading, this spring being always interposed between the fuselage and the abutment collar 36 on the link and thus at all times under compression. When the wing moves down to its idle position the shoulder 40 on the link 24 will engage with the abutment collar 41 to move it down away from the abutment collar 39 so that, when the airplane is grounded, the outer spring 37 will be active to supplement gravity in holding the wing in its down or idle position.

During the take-off run of the plane, the wing structure picks up the load. The part of this load due to angle of attack of the wing has its resultant effect at the mean aerodynamic center of the wing structure, and upward swing of the wing under this pressure will at first be resisted only by the outer spring 37 until the abutment collar 41 for the inner spring comes into engagement with the abutment collar 39 for the outer spring and then both springs will be under compression when the airplane is finally air borne, the swing or rotation of the wing being dampened by the dash pot 33. Figure 5 shows the airplane in level flight through still air, both springs 37 and 38 functioning to balance the lift load on the wing structure.

When an airplane with fixed wing structure encounters an up-gust the effect is substantially as though the angle of attack of the wing were suddenly increased and the airplane moves upwardly from its level flight path. Down-gusts have just the opposite effect.

Suppose now that the airplane of the present invention having the hinged wing encounters an up-gust. The resulting increased lift load on the wing structure having its effect at the aerodynamic center thereof will rotate it counter-clockwise against the resistance of the spring assembly without producing a reaction on the hinge. Under such rotation the angle of attack of the wing is decreased and the effect of the gust is reduced, and after passage of the plane through the up-gust, the spring assembly will swing back the wing structure toward its normal angle of attack before the gust was encountered. Thus, with this arrangement, sudden upward acceleration of the airplane is prevented during up-gusts.

Suppose now that the airplane while in level flight through still air encounters a down-gust. Upon entering the down-gust, initially both springs of the spring assembly will rotate the wing structure in clockwise direction, as a result of the reduced lift load on the wing, to quickly increase the angle of attack to offset the effect of the down-gust to prevent sudden downward acceleration or drop of the airplane. As the angle of attack of the wing increases, the corresponding recovery of the lift load on the wing will counteract the effect of the down-gust. Initially the wing is rotated by both springs, but after a slight rotation of the wing under the down-gust, from the position shown on Figure 5, the shoulder 40 on the link 24 will move the abutment 41 for the inner spring 38 away from the abutment collar 39 so that this inner spring becomes idle and only the outer spring 37 will be effective to resist the up load on the wing tending to counteract the effect of the down-gust. After passage of the plane through the down-gust, the wing will then assume its normal flight attitude as the load carried by the wing increases to its normal value corresponding to the increase in angle of attack of the incident air to its normal value with the passing of the down-gust, as shown on Figure 5, but with the plane at a slightly lower level. In other words, a sudden down-gust on the plane will not result in sudden dropping or even pulling of the plane to a lower level, but the flight to a slightly lower level will be gradual and easy and without disagreeable effect on the plane passengers.

It is desirable to eliminate almost entirely the effect of down draft or gust, but, if the effect of up draft or gust is eliminated to the same extent, the airplane will not function properly in normal maneuvers as, for example, during banked turns under which conditions the wing must carry a load greater than that of the weight of the airplane. With my improved spring arrangement, such flight conditions can be readily controlled. Suppose that the plane, as shown on Figure 5, is travelling at 125 miles per hour and encounters a down-gust. If this down-gust is of comparatively small magnitude, not in excess of say five feet per second, both springs 37 and 38 may remain active to rotate the wing and overcome the decreased uplift resulting from the decreased angle of attack, thereby causing the plane to drop much less than it would have dropped had the wing been rigidly connected to the fuselage. However, if the magnitude of the down-gust is as much as say thirty feet per second, the wing will be suddenly rotated clockwise through a much greater angle, and may be rotated all the way down for engagement of the stop 42 with the fuselage. Now only the outer spring 37 will be effective and the resulting lift on the wing due to the largely increased angle of attack will be balanced by spring 37. The resulting uplift during the duration of the down-gust is less than that during steady normal flight, but much more than that of a conventional airplane which under a down-gust of 30 feet per second will be a negative lift or a downward force causing the airplane to accelerate downwardly. The outer spring 37 should be selected so that, when the wing is in its extreme down position under a down-gust of say thirty feet per second intensity the up load of the wing to just balance the force of the spring will be equal to say 0.7 times the weight of the airplane. Thus, the effect of down-gusts is almost entirely eliminated quickly and in greater part by the functioning of the outer spring 37 alone, both springs functioning in the elimination of the down-gust effects only at the beginning of down movement of the wing when encountering a down-gust, and during the final movement of the wing back to its normal flight angle. In the arrangement shown, the load in the outer spring 37 is always greater than the load in the inner spring 38, but the spring rate of spring 38 is greater.

If the airplane, Figure 5, should encounter an up draft or gust of say, 30 feet per second magnitude and only a single spring such as the outer spring 37 were provided, the angle of counterclockwise rotation of the wing in response to the up-gust would be larger and the load carried by the wing would be equal to say only about 1.25 times the weight of the airplane. However, by providing the second spring the resulting spring rate would be increased and the wing could rotate only through a smaller angle and the load on the wing for the same up-gust would be higher, to the extent of say about 1.7 to 2 times the weight of the airplane. Thus, while the effect of up-gust is not entirely eliminated, the springs will function to hold the wing capable of supporting sufficient load under maneuvering conditions, such as banking. With my improved flight control arrangement it will be possible to keep the wing at the right attitude for a load factor of 1.0 and at the same time to have an up load on the wing equal to 0.7 load factor under the action of a down-gust of thirty feet per second, and also to develop a load factor of 1.7 or more under the action of an up-gust of thirty feet per second.

With the control arrangement shown, the wing under down-gust conditions and downward acceleration, will lose only a comparatively small part of its lift, say about 30%, so that the load carried by the wing will still be an up load. Thus the lower side of the wing when in flight will never be stressed in compression, only the top of the wing being stressed in compression by flight load. With my improved control, these stresses will be very much smaller than those developed in conventional airplanes and therefore, with my improved control applied, airplane structures may be made lighter and the saving in weight can be used as increased pay load.

Figures 1, 2 and 5 show the adjustable elevational control surface 45 mounted on a bracket 46 extending upwardly from the fore part of the wing so that this control surface will move with the wing to follow the movement thereof during up-gusts or down-gusts. This is desirable since a gust would otherwise build up a large load on the control surface which might tend to cause the airplane to rotate about its center of gravity.

Control surface 45 is located forward of the wing hinge line 20. Thus, when a control force is applied by the surface 45 to raise the nose of the airplane, as in zooming or when in a banked turn, the load, which would be upward on control surface 45, aids the spring assembly S in balancing the added load carried by the wing (normal load on wing plus load causing airplane to accelerate). Thus, with the control surface 45 located forward of the wing hinge line, 20, the wing rotates less under the force of the greater load induced by a control maneuver than if the control surface 45 were located on the fuselage rather than the wing, or if it were located nearer to or aft of the wing hinge line 20.

Figure 7 shows my improved spring control applied to an airplane provided with a tail plane 47, the wing structure 48 being of the sweep-back type as in Figure 2. The control spring assembly is the same as that in Figure 5 and therefore the same reference numerals are applied thereto. The spring assembly is arranged horizontally with the outer end of the link 24 connected by a bell crank lever 49 with a link 50 extending from the bracket 23 on the spar beam 22 of the wing. The spring assembly link 24 has the rearward extension 51 connected by a bell crank lever 52 with a link 53 which is pivoted to the tail plane 47. The tail plane is thus connected to rotate with the rotation of the wing 48 during response and control of the wing under down or up-gust flight conditions.

Reference is made to my copending Patent No. 2,428,194, issued September 30, 1947.

It will be understood that modifications and variations may be effected without departing from the scope of the novel concepts of the present invention.

I claim:

1. In an airplane having a fuselage and a wing structure, means hinging said wing structure to the fuselage along a hinge line through the wing structure forwardly of the mean aerodynamic center and rearwardly of the leading edge thereof, and a spring assembly interposed between the fuselage and the aerodynamic center of the wing structure for controlling rotation of the wing structure on the hinge axis during flight of the airplane through up-gusts or down-gusts, said spring assembly comprising two springs, means for connecting both springs with the fuselage and wing structure for joint functioning thereof to resist rotation of the wing structure by up-gusts during flight of the airplane, and means for causing one of said springs to function alone, and while the second spring remains substantially idle, for control of the wing structure during down-gusts.

2. In an airplane having a fuselage and a wing thereon, means hinging said wing to the fuselage along a hinge line extending through the wing forwardly of the aerodynamic center thereof whereby said wing may rotate relative to the fuselage for change of the angle of attack, and a spring assembly on said fuselage having connection with the wing structure at substantially its mean aerodynamic center for resisting rotation of the wing in direction for decreasing the angle of attack, said spring assembly comprising two springs and means for causing the initial rotation swing of said wing to be resisted by only one of said springs and while the second spring remains substantially idle but thereafter to be resisted by both springs.

3. In an airplane having a fuselage and a wing structure thereon, means hinging said wing structure to the fuselage along a hinge line forwardly of the aerodynamic center of the wing structure whereby said wing structure may swing vertically, a spring assembly on said fuselage connected with said wing structure substantially at its mean aerodynamic center for resisting upward swing of said wing structure during flight of the plane, said spring assembly comprising two springs, means for causing both springs to be effective to resist upward swing of the wing structure by up-gusts when the plane is in flight, and means causing only one of said springs to be primarily effective, and while the second spring remains substantially idle, to resist upward swing of the wing structure after downward swing thereof by a down-gust while the plane is in flight.

4. In an airplane having a fuselage and a wing structure, means hinging said wing structure to the fuselage along a line extending transversely of the fuselage aft of the leading edge of the root chord and forwardly of the aerodynamic center of the wing structure, a spring assembly mounted on the fuselage and connecting with said wing structure aft of the hinge line to control the vertical swing of the wing structure to reduce the effects of up or down gusts during flight, said spring assembly comprising two concentric compression springs, means causing both springs to be active to resist rotation of the wing structure by up-gust during flight and to cause one of said springs to function alone and while the second spring remains idle for control of the wing structure during down-gust.

5. In an airplane having a fuselage and a wing structure thereon having pronounced sweep-back whereby the aerodynamic center of the structure will be close to the rear edge of the root chord, means hinging said wing structure to the fuselage along a line extending transversely through the root chord and near but aft of the leading edge thereof for rotation of said wing structure relative to the fuselage, a connection extending from the fuselage and engaging with said wing structure at substantially its mean aerodynamic center, a spring assembly included in said connection for controlling the rotation of said wing structure relative to the fuselage during up-gust or down-gust conditions during flight of the airplane, and means for causing the spring rate of said spring assembly to be greater during up-gust conditions than during down-gust conditions.

6. In an airplane having a fuselage and a wing structure thereon having pronounced sweep-back whereby the aerodynamic center of the structure will be close to the rear edge of the root chord, means hinging said wing structure to the fuselage along a line extending transversely through the root chord and near but aft of the leading edge thereof for rotation of said wing structure relative to the fuselage, a connection extending from the fuselage and engaging with said wing structure at substantially its mean aerodynamic center, a spring assembly included in said connection for controlling the rotation of said wing structure relative to the fuselage during up gust or down gust conditions during flight of the airplane, means for causing the spring rate of said spring assembly to be greater during up gust conditions than during down gust conditions, and a hydraulic damper in said spring connection effective at the mean aerodynamic center of the wing structure for damping the movement thereof.

7. In an airplane comprising a fuselage, a wing of the sweep-back type possessing positive pitching moment characteristics about its aerodynamic center, means hinging said wing to the fuselage along a line extending through the wing rearwardly of the leading edge and forwardly of the mean aerodynamic center thereof whereby said wing may rotate relative to the fuselage for change of the angle of attack, and a spring assembly connecting the wing with the fuselage at substantially the mean aerodynamic center of the wing and including a pair of spring members operable jointly to resist up-gust movement of the wing and one of said spring members remaining substantially idle in the down-gust movement of the wing while the other spring member continues active to increase the angle of attack of the wing.

8. In an airplane having a fuselage and a wing structure, means hinging said wing structure to the fuselage along a hinge line adjacent the leading edge of the wing structure whereby said wing structure may swing vertically relative to the fuselage, a spring assembly mounted on the fuselage and having connection with the wing structure substantially rearwardly of the leading edge to act in resisting up-swing of the wing structure, and means acting on said spring assembly to decrease its spring rate during down-draft conditions.

9. In an airplane having a fuselage and a wing structure, means hinging said wing structure to the fuselage along a hinge line adjacent the leading edge of the wing structure whereby said wing structure may swing vertically relative to the fuselage, a spring assembly mounted on the fuselage and having connection with the wing structure substantially rearwardly of the leading edge to act in resisting up-swing of the wing structure, said spring assembly comprising a plurality of spring elements operative together in one phase of the upswinging movement of the wing structure, and one of said spring elements being constructed and arranged to remain idle in another phase of wing structure upswinging movement, whereby to reduce the resistance to movement of the wing structure in the latter phase of the upswinging movement.

10. In combination in an airplane having a fuselage and a wing hingedly mounted on the fuselage and being responsive to swing hingedly in up gusts and down gusts during flight, a resistance structure having connection with the wing and with the fuselage and comprising two yieldable resistance members, means for causing both resistance members to be effective to resist upward swing of the wing by up gusts, and means causing only one of the resistance members to be primarily effective and while the second resistance member remains substantially idle, to resist upward swing of the wing after downward swing thereof by a down gust.

11. In combination in an airplane having a fuselage and a wing hingedly mounted on the fuselage and being responsive to swing hingedly in up gusts and down gusts during flight, a resistance structure having connection with the wing and with the fuselage and comprising a plurality of spring members acting jointly to resist upward swing of the wing by up gusts, and abutment means acting on one of the spring members to render it ineffective during down-gusts while the remaining spring member remains active for resisting the down-gusts.

12. In an airplane having a fuselage and a wing structure hingedly mounted on the fuselage along a line extending transversely of the fuselage aft of the leading edge of the root chord and forwardly of the aerodynamic center of the wing structure, a spring assembly connected between the fuselage and the wing structure for controlling vertical swinging movement of the wing structure to reduce the effects of up or down gusts during flight, said spring assembly comprising two concentric spring members, and means causing both of the spring members to be active to resist rotation of the wing structure by up gusts during flight and to cause one of the spring members to function alone and while the other spring member remains idle for control of the wing structure during down gusts.

13. In a tailless type airplane, a fuselage, a swept back wing having its mean aerodynamic center quite far back from its leading edge as projected on the root chord of the wing, said wing being hingedly mounted on the fuselage along a line aft of the leading edge of the root chord and forward of the mean aerodynamic center of the wing, resistance structure having connection with the wing and with the fuselage and yieldably resisting movements of the wing in up-gusts and down-gusts, an elevator structure carried by and movable with said wing structure, said elevator structure being mounted at the leading edge of the wing structure and being adjustable as to its angle of attack independently of and relative to the wing structure, and rudder structures mounted on the respective wing tip portions of the wing.

14. In combination in an airplane, a fuselage, a wing structure of pronounced sweep-back having the mean aerodynamic center quite far back from its leading edge as projected on the root chord of the wing, and connecting means between the wing structure and the fuselage to enable and to control air pressure responsive swinging movement of the wing structure about an axis adjacent to but aft of the leading edge of the root chord and substantially forwardly of the mean aerodynamic center of the wing structure, said means including a supporting pivot structure and control mechanism comprising a pair of movement-resisting members and means operatively correlating said members for joint resistance of up-gust movements of the wing structure, but relieving one of the members from down-gust resistance while the remaining member provides down-gust resistance to wing movement.

15. In combination in an airplane, a fuselage, a wing, means hinging said wing to the fuselage along a line adjacent to the leading edge of the wing so that the wing can swing relative to the fuselage throughout a substantial range for variation in angle of attack to compensate for and alleviate diversions from level flight of the airplane when encountering up or down gusts, and mechanism for automatically and independently of pilot effected maneuvers controlling the pivotal movements of the wing about its hinge axis for adjusting the angle of attack responsive to up or down gusts during flight, said mechanism comprising a pair of movement resisting members and means connected to the wing and operatively interconnected to both of said members for joint resistance to up gust movement of the wing and arranged to relieve one of said members during down gust movement while the remaining member provides resistance to down gust movement of the wing.

GEORGE E. BOCKRATH.

REFERENCES CITED

The following references are of record in the file of this patent:

UNITED STATES PATENTS

| Number | Name | Date |
|---|---|---|
| Re. 18,181 | Stelzer | Sept. 8, 1931 |
| 1,040,533 | Esnault-Pelterie | Oct. 8, 1912 |
| 1,106,061 | Schroeder | Aug. 4, 1914 |
| 1,425,455 | De Santis | Aug. 8, 1922 |
| 1,935,824 | Upson | Nov. 21, 1933 |
| 2,063,030 | Crouch | Dec. 8, 1936 |
| 2,128,060 | Spratt | Aug. 23, 1938 |
| 2,156,994 | Lachmann | May 2, 1939 |
| 2,172,289 | Munk | Sept. 5, 1939 |
| 2,363,550 | Reichert | Nov. 28, 1944 |

FOREIGN PATENTS

| Number | Country | Date |
|---|---|---|
| 752,680 | France | July 24, 1933 |
| 17,848 | Great Britain | of 1914 |